(12) United States Patent
Burris et al.

(10) Patent No.: US 8,353,339 B2
(45) Date of Patent: Jan. 15, 2013

(54) APPARATUS FOR THE MEASURING OF FLUID LEVELS AND PUMPING OF THE SAME

(75) Inventors: Sanford A. Burris, Kirtland, OH (US); David R. Hill, Lorain, OH (US)

(73) Assignee: Hytech Energy, LLC, Bakersfield, CA (US)

( * ) Notice: Subject to any disclaimer, the term of this patent is extended or adjusted under 35 U.S.C. 154(b) by 1382 days.

(21) Appl. No.: 11/016,565

(22) Filed: Dec. 18, 2004

(65) Prior Publication Data

US 2006/0131028 A1    Jun. 22, 2006

(51) Int. Cl.
*E21B 47/04* (2012.01)
(52) U.S. Cl. ............... 166/250.01; 73/152.58; 181/102; 367/87
(58) Field of Classification Search ............. 166/250.01; 181/102, 106; 367/86, 88, 99, 908; 73/152.58
See application file for complete search history.

(56) References Cited

U.S. PATENT DOCUMENTS

| | | | |
|---|---|---|---|
| 3,337,841 A | | 8/1967 | Wainwright |
| 3,965,983 A | * | 6/1976 | Watson ................... 166/250.15 |
| 4,934,186 A | * | 6/1990 | McCoy ..................... 73/152.58 |
| 5,576,480 A | | 11/1996 | Hopkins et al. |
| 6,771,788 B1 | | 8/2004 | Soutar et al. |

* cited by examiner

*Primary Examiner* — Giovanna Wright
(74) *Attorney, Agent, or Firm* — James M. Duncan, Esq.; Klein, DeNatale, Goldner Cooper, etc.

(57) ABSTRACT

A device for employing sonic transmissions is utilized to determine fluid level in a well or a container. The device may be utilized while the well is operating. It is known that wells replenish fluid at different rates even in the same formation or well field. Increased well production at minimum pumping cost is achieved for a given well. The device generates a sonic event through the use of a compressed fluid that is obtained from within a well. A fluid level measurement system is obtained in a well in which gas is produced under vacuum.

14 Claims, 5 Drawing Sheets

APPARATUS FOR THE MEASURING OF FLUID LEVELS AND PUMPING OF THE SAME

BACKGROUND OF THE INVENTION

1. Field of the Invention

The present invention relates to determining the level of a fluid in a well such as a gas well, an oil well, or water well.

2. Description of the Art Practices

It is known that wells replenish fluids at different rates even in the same formation or well field. The rate of fluid flow into the well bore is maximized because the hydrostatic head driving the fluid is at a maximum. See for example Burris, et al., U.S. Pat. No. 6,085,836 issued Jul. 11, 2000. The Burris, et al., patent is incorporated herein by reference.

The preceding observation suggests that the well pump should run constantly to keep the level in the well bore as low as possible thus maximizing production. Of course, this is often unsatisfactory for several reasons.

First, running the pump constantly or at too great a speed is inefficient since, some of the time, the well bore is completely empty and there is nothing to pump. Thus, energy conservation becomes a cost consideration. Second, the equipment is subject to wear and damage resulting in costly repairs when pumps are run dry. Third, paraffin build up is more pronounced when a well is allowed to pump dry. In the dry pump condition gases are drawn into the bore. The gases in the bore then expand and cool. As the gases cool, paraffin build up is promoted as these high melting hydrocarbons begin to plate out on the surfaces of the bore. However, a well may be pumped continuously provided that the liquid level of the well is high enough to ensue the well sump has liquid therein, e.g. avoid pumping gas into the tubing.

Given the above considerations, control strategies aimed at optimizing well production have emerged. Notably, timers have been used to control the pump duty cycle. A timer may be programmed to run the well nearly perfectly if the one could determine the duration of the on cycle and off cycle which keeps the fluid level in the bore low but which does not pump the bore dry.

The pump on cycle and off cycle can be determined for a group of wells or for an entire well field. Savings in energy may be maximized by knowing which wells fill at what rate and then optimizing pumping to reduce or maintain a constant electric load below the maximum peak available.

Given fluid level information, deciding when or how fast to run the pump is very straightforward and production can be optimized. Fluid level determinations, particularly for deep down hole (bore) systems, have been implemented. Unfortunately, these deep down hole systems have been costly and complex to install, unreliable in operation, and costly to repair or service. Although the implementation details will not be discussed here, it is worth noting that these systems, when operating correctly, have proven that significant gains in well production are available when control strategies using fluid level measurement are applied.

One system that has been attempted is the use of one-shot measurements. The one-shot measurement will use a sonic event such as a shotgun shell to generate the event. Another system is based on a nitrogen tank being utilized to generate a sonic event. In either of the foregoing systems the production of the well must be shut down to implement the sonic event and the corresponding data evaluations. By contrast the present invention will permit continuous operation of the well as the sonic events are generated, the data collected, the well conditions read out, and changes in pumping implemented.

Moreover, the system of the present invention is conducted utilizing fluid from the well thus avoiding the cost of the nitrogen and does not require opening of the well to the atmosphere.

Clearly, what is needed is a control system with the advantages of fluid level measurement which is cost effective to install and operate and which is reliable. Basic features for fluid level measurement should include applicability to oil, water, or other wells and should be applicable to rod, screw (such as by a frequency drive), or other pump types.

A fluid level measurement system should be simple and inexpensive to install in the T-Head and useful for well depths to 10,000 feet. Such a fluid level measurement system should be self calibrating for each installation and accurate to 10 feet (3.1 meters). The system should be robust to harsh environments within and around the well.

A fluid level measurement system is desirably able to provide fluid level measurements in well in which gas is produced under vacuum. That is, some wells do not have sufficient pressure in the well to permit the gas to flow to the T-Head. In such cases, the well is often one in which methane is derived from a coal seam in which progressive cavity pumps are employed.

SUMMARY OF THE INVENTION

The present invention describes a device for controlling pump conditions comprising:
a T-Head connector;
   at least one microphone connected with said T-Head connector;
   a gas compression chamber connected with said T-Head connector;
   a first valve for controlling fluid communication between said gas compression chamber and a wellhead;
a computer controller;
said computer controller connected with said first valve to open and close said first valve to permit fluid communication between said gas compression chamber and the wellhead;
said computer controller to activate said gas compression chamber, for when in use, to compress gas from the wellhead to obtain a compressed gas at a greater pressure than that of the wellhead,
and,
said computer controller connected with said gas compression chamber, for when in use, to open a valve to release the compressed gas into the wellhead.

The present invention also describes a device for controlling pump comprising:
a T-Head connector;
at least one microphone connected with said T-Head connector;
a piston chamber connected with said T-Head connector;
a piston located within said piston chamber;
a first valve for controlling fluid communication between said piston chamber and a wellhead;
a second valve for controlling fluid communication between said piston chamber and the wellhead;
said first valve and said second valve located on opposite sides of said piston;
a computer controller;
said computer controller connected with at least one of said first valve or said second valve to open and close said first valve or said second valve to permit fluid communication between said piston chamber and the wellhead; and, said computer controller connected with said piston, for when in use, to drive said piston in said cylinder.

A further aspect of the present invention describes a method for comprising:
at least partially opening a first valve to permit fluid communication between a gas compression chamber and a wellhead;
closing said first valve to prevent fluid communication between said gas compression chamber and the wellhead;
activating said gas compression chamber to compress fluid in said gas compression chamber thereby obtaining a compressed fluid in said gas compression chamber;
at least partially opening said first valve to release the compressed fluid into the wellhead thereby generating a sonic event;
obtaining data from the sonic event;
processing the data from the sonic event to determine the conditions for controlling the pump.

Yet another aspect of the present invention describes a method for controlling pump conditions for a well comprising:
closing a first valve to prevent fluid communication between a piston chamber and a wellhead;
moving a piston in said piston chamber away from said valve;
opening said valve to permit fluid from the wellhead into the piston chamber thereby generating a sonic event;
obtaining data from the sonic event;
processing the data from the sonic event to determine the conditions for controlling the pump.

Yet another aspect of the present invention describes a method for compressing a method for controlling pump conditions for a well comprising:
closing a first valve in a piston chamber to prevent fluid communication between said piston chamber and the wellhead;
simultaneously closing a second valve in said piston chamber to prevent fluid communication between said piston chamber and the wellhead;
moving a piston in said piston chamber away from said first valve so as to create a partial vacuum in the region between said first valve and said piston while compressing fluid in the region between said second valve and said piston;
simultaneously opening said first valve and said second valve to create a first sonic event in the wellhead and a second sonic event in the wellhead;
obtaining data from at least one of the sonic events; and,
processing the data from the sonic event to determine the conditions for controlling the pump.

The present invention also describes a device for receiving audio signals comprising a method for controlling pump conditions for a well comprising:
at least partially opening a first valve to permit fluid communication between a piston chamber and a wellhead;
said piston chamber having therein a piston;
said piston having a front face and a rear face;
said piston chamber having a second valve;
closing said first valve to prevent fluid communication between said piston chamber and the wellhead;
driving said piston within said piston chamber in the direction of said first valve such that the first face of said piston compresses fluid in said piston chamber thereby obtaining a compressed fluid in said piston chamber;
at least partially opening said first valve to release the compressed fluid into the wellhead thereby generating a sonic event;
obtaining data from the sonic event;
processing the data from a sonic event to determine the conditions for controlling the pump The present invention describes a device for receiving audio signals comprising a method for determining at least one of the amount of a liquid phase and/or a gaseous phase in a sealable container, for when in use the sealable container containing a liquid phase and a gaseous phase, the sealable container having located therein:
at least one microphone;
a gas compression chamber;
a piston located within the gas compression chamber;
a first valve for controlling fluid communication between the gas compression chamber and said sealable container;
means to open and close the first valve to permit fluid communication between the gas compression chamber and the sealable container; and,
means to drive the piston in the gas compression chamber, closing the first valve to prevent fluid communication between the gas compression chamber and the sealable container;
then causing at least one of:
moving the piston in the gas compression chamber away from the first valve to cause at least a partial vacuum in the gas compression chamber;
opening the first valve to permit fluid communication between the sealable container and the gas compression chamber thereby generating a sonic event by fluid from the sealable container moving into the gas compression chamber, or
compressing fluid within the gas compression chamber to obtain a compressed fluid with the first valve closed to prevent evacuation of the fluid from the gas compression chamber and opening the first valve to release the compressed fluid into the sealable container thereby generating a sonic event; and,
obtaining data from the generation of the sonic event with the microphone, correlating the data, and determining at least one of the amount of a liquid phase and/or a gaseous phase in the sealable container.

Yet another aspect of the present invention describes a device for receiving audio signals comprising
a microphone having microphone leads;
said microphone and microphone leads encased in substantially hydrocarbon impervious flexible tubing; and,
said microphone capped with a latex cover.

A further aspect of the present invention describes a device for receiving for receiving audio signals comprising
a microphone having microphone leads;
said microphone and microphone leads encased in substantially hydrocarbon impervious flexible tubing; and,
a heating element is located within said flexible tubing.

A further aspect of the invention is a device for receiving audio signals comprising
a microphone having microphone leads;
said microphone and microphone leads encased in substantially hydrocarbon impervious flexible tubing;
a heating element is located within said flexible tubing; and,
said microphone capped with a latex cover.

BRIEF DESCRIPTION OF THE DRAWINGS

Further features of the present invention will become apparent to those skilled in the art to which the present invention relates from reading the following specification with reference to the accompanying drawings, in which.

DETAILED DESCRIPTION OF THE INVENTION

Figure 1:
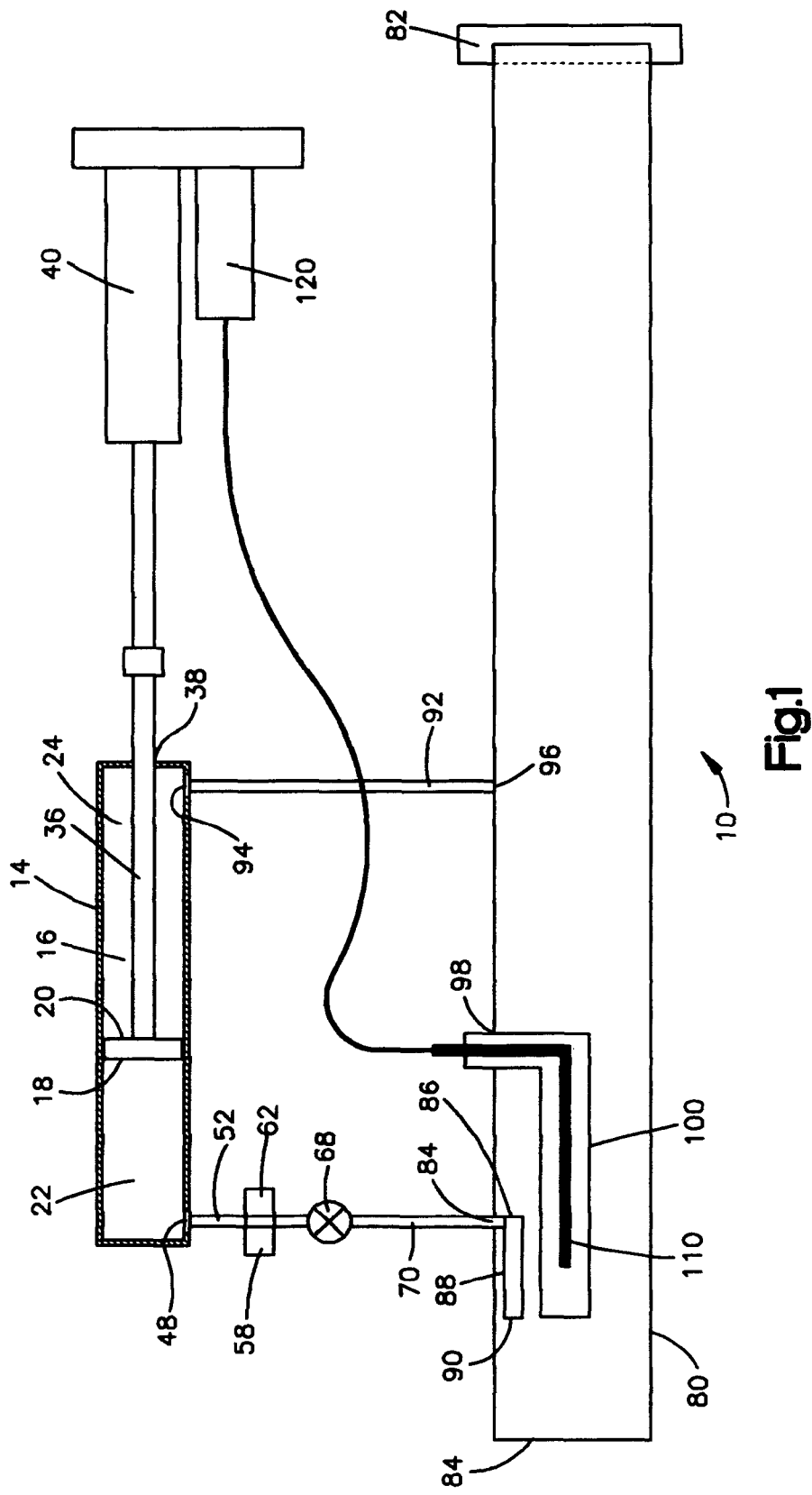
FIG. 1 is a partial sectional view of an aspect of the invention.
Figure 2:
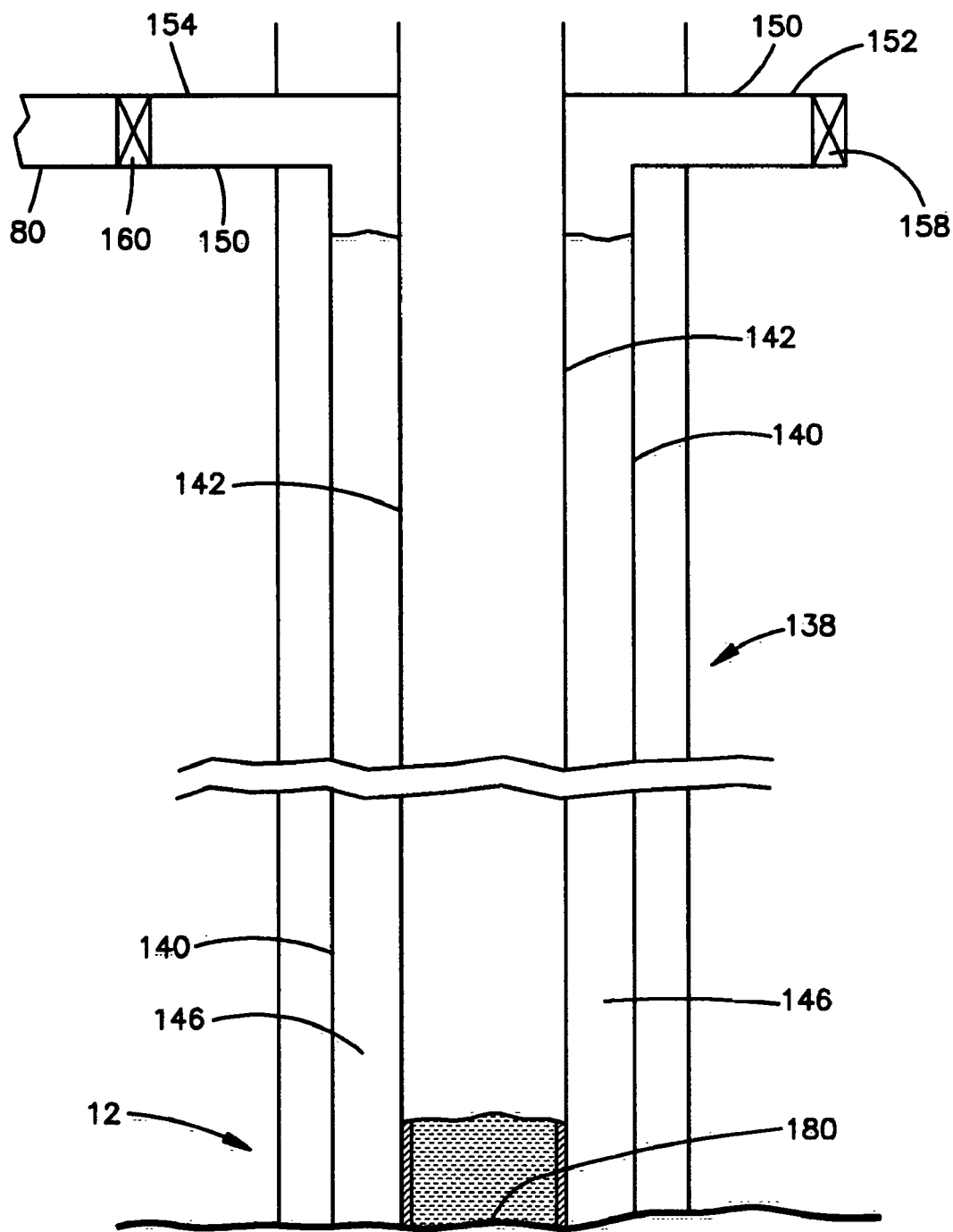
FIG. 2 is a partial sectional view of a well head system.

A pump controlling device 10 for controlling pump conditions in a well is shown in FIG. 1. The pump controlling device 10 is connected with well 12 as seen in FIG. 2. The pump controlling device 10 comprises a gas compression chamber shown herein as a piston chamber 14. A piston 16 is located within the piston chamber 14. The piston 16 has a piston front face 18 and a piston rear face 20. The term compression chamber herein means any suitable means of compressing a gas.

The piston chamber 14 has a piston fore chamber 22 located on the side of the piston chamber 14 adjacent to the piston front face 18. The piston 16 forms an airtight seal to prevent fluid communication between the piston front face 18 and the piston rear face 20. The piston chamber 14 has a piston after chamber 24 located on the side of the piston chamber 14 adjacent to the piston rear face 20.

The piston 16 has a piston stem 36. The piston stem 36 extends axially in after chamber 24 and extends through an airtight opening 38. The piston stem 36 is connected with a piston driver 40. The piston driver 40 is conveniently operated by any source of power such as electricity or steam. The piston driver 40 may also be hydraulically operated.

The piston fore chamber 22 has an opening 48. A conduit 52 forms an airtight seal at the opening 48 with the piston fore chamber 22. The conduit 52 is thus in fluid communication with the piston fore chamber 22.

The conduit 52 is connected with a pressure measuring device 58. The pressure measuring device 58 is located so as to determine fluid pressure within the conduit 52. The conduit 52 is also connected with a temperature measuring device 62. The temperature measuring device 62 is located so as to determine fluid temperature within the conduit 52.

A valve 68 provides for fluid flow and fluid shutoff to the conduit 52. A second conduit 70 is connected to the valve 68. The valve 68 controls fluid flow between the conduit 52 and the second conduit 70.

A T-Head connector 80 is a generally cylindrical barrel having an air tight closure cap 82 at one end. The T-Head connector 80 has an opening 84 at the opposite end from the closure cap 82. The second conduit 70 extends through the opening 84 into the T-Head connector 80. The second conduit 70 makes an airtight connection with the T-Head connector 80.

The second conduit 70 has a right angle bend 86 within the T-Head connector 80. The right angle bend 86 provides a second segment 88 of the second conduit 70.

The second segment 88 of the second conduit 70 has an opening 90 to provide fluid communication to the T-Head connector 80 of a well 12. The opening 90 is at the opposite end from the closure cap 82. Thus, when the valve 68 is in the open position there is fluid communication from the opening 90 to the piston fore chamber 22.

A tube 92 extends between the piston after chamber 24 and the T-Head connector 80. The tube 92 makes an airtight seal with the piston after chamber 24 at an opening 94 in the piston after chamber 24. The opening 94 is located in the piston after chamber 24 such that the maximum stroke of the piston 16 by the piston stem 36 does not permit the piston front face 18 to be positioned such that there is fluid communication between the piston fore chamber 22 and the tube 92.

An opening 96 is located in the T-Head connector 80. The tube 92 makes an airtight seal with the T-Head connector 80 at the opening 96. The tube 92 provides fluid communication between the piston after chamber 24 and the T-Head connector 80.

A microphone opening 98 is located in the T-Head connector 80. A microphone conduit 100 is adapted to form an airtight seal in the T-Head connector 80 at the microphone opening 98. The microphone conduit 100 has an open end 102 in fluid communication the T-Head connector 80.

The microphone 110 is preferably a condenser microphone. The microphone 110 is preferably unidirectional. The microphone 110 is connected with a computer 120. The computer 120 is capable of processing the reception of sonic events by the microphone 110. For convenience, the various leads to the computer 120 are not shown and labeled in the Figs. The computer 120 is also capable of providing a signal to drive the piston 16 in the piston chamber 14.

Figure 3:
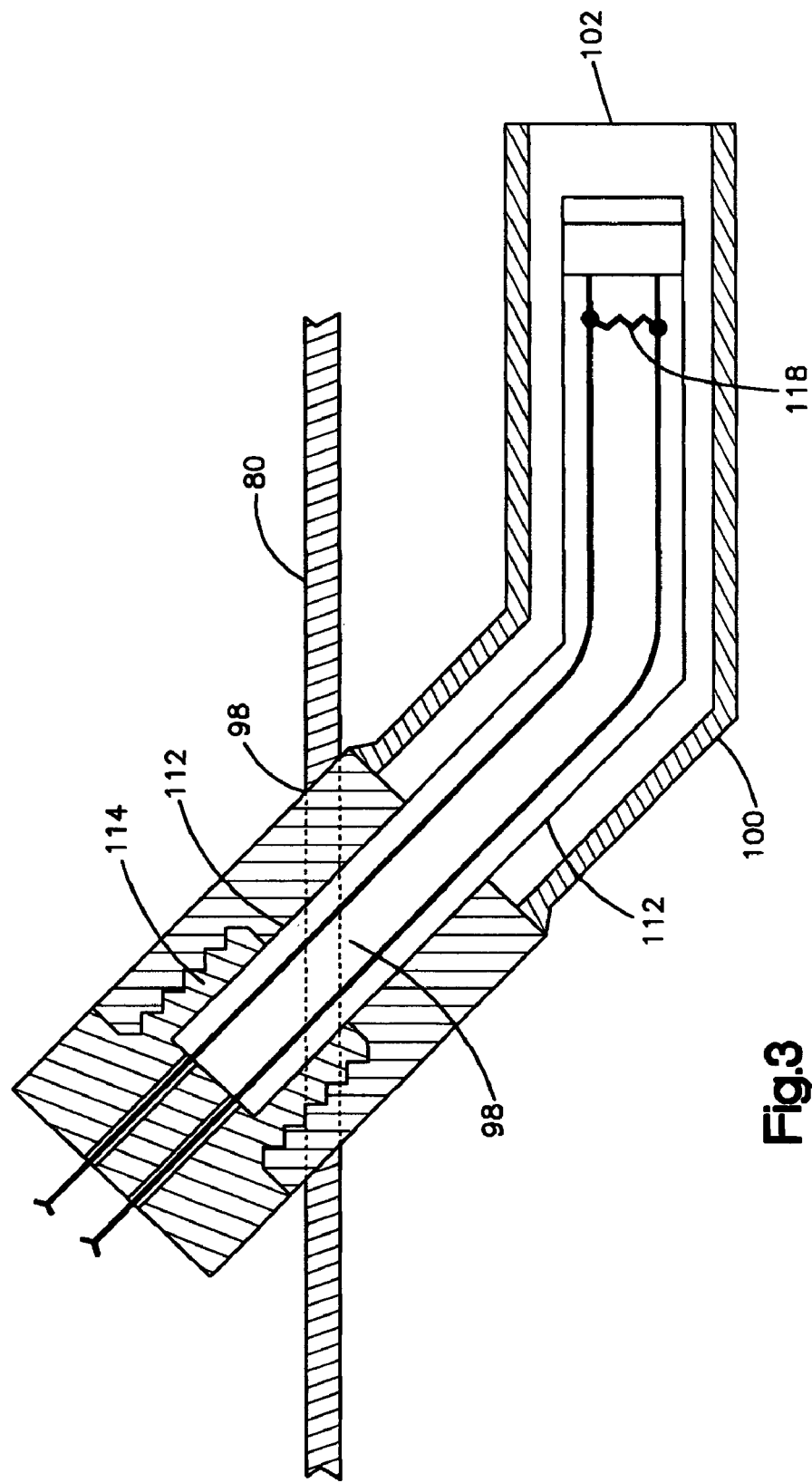
FIG. 3 is a view of a microphone according to the invention.

The microphone is best seen in FIG. 3. The microphone 110 is enclosed by a microphone sleeve 112. The microphone sleeve 112 has a threaded screw 114 at one end. A microphone cap 116 fits over the microphone sleeve 112 to protect the microphone 110 from dust. A microphone heating element 118 is placed in the microphone sleeve 112 to protect the microphone 110 from condensation. The microphone sleeve 112 is conveniently bent at a 45 degree angle to permit easy insertion into the T-Head connector 80 at the microphone opening 98.

As best seen in FIG. 2, the well 12 comprises in part a wellhead 138. A well casing 140 is located within the wellhead 138 and extends downward into the well 12. The wellhead 138 may also be utilized for the underground storage of propane or other liquefied gas. In the later case there is no annulus but rather tubing in which the pump controlling device 10 is conveniently mounted.

Well tubing 142 is located within the well casing 140. The well tubing 142 extends downward in the well casing 140 forming an annulus 146 between the outer surface of the well tubing 142 and the inner surface of the well casing 140.

The well casing 140 and the well tubing 142 are fastened to a standard T-Head connection 150. The well casing 140 and the well tubing 142 are not in fluid communication at the T-Head connection 150.

The T-Head connection 150 has two pipes 152 and 154. A T-head valve 158 and a T-head valve 160 respectively terminate the pipes 152 and 154 of the T-Head connection 150.

The pipe 152 in the T-Head connection 150 is utilized to remove, in the case of an oil and gas well, the gas. The second pipe 154 is utilized as a backup. In the present invention the T-Head connector 80 is connected to the opposite side of the T-head valve 160 from the pipe 154. The T-Head connector 80 is in fluid communication with the annulus 146 of the well when the T-head valve 160 is open.

In operation, the valve 68 is placed in the closed position to prevent fluid communication between the T-Head connector 80 and the piston fore chamber 22. The T-head valve 160 is open such that the T-Head connector 80 is in fluid communication with the T-Head connection 150. The T-Head connection 150 is then in fluid communication with the annulus 146 of a well as shown in FIG. 2.

The pressure of the gas in the annulus 146 is determined by the pressure measuring device 58 with the valve 68 open. The pressure determined by the pressure measuring device 58 is reported to the computer 120.

The temperature measuring device 62 may be used to measure the fluid temperature in the annulus 146 at this time. As the operation of the invention may be conducted in a dynamic manner the temperature of the fluid drawn through the T-Head connector 80 is effectively the temperature of the fluid in annulus 146. The fluid temperature determined by temperature measuring device 62 is reported to the computer 120.

The valve 68 is then placed in the closed position preventing further fluid communication between the annulus 146 and the piston fore chamber 22. The piston 16 is moved away from the closed valve 68 causing an effective axial expansion of the piston fore chamber 22 with the result being a partial vacuum in the piston fore chamber 22. There is no practical resistance to the movement of the piston 16 as the tube 92 is in fluid communication with the after chamber 24.

The piston 16 is then driven toward the closed valve 68. Driving of the piston 16 compresses the fluid in the piston fore chamber 22 thereby forming a compressed fluid having a greater pressure and temperature than the fluid in the annulus 146. Typically, it is desirable that the pressure of the compressed fluid in the piston fore chamber 22 be at least 30 psi greater than the pressure of the fluid in the annulus 146.

The pressure and the temperature of the compressed fluid in the piston fore chamber 22 may be measured by the pressure measuring device 58 temperature measuring device 62 and reported to the computer 120.

The valve 68 is then opened releasing the compressed fluid through the second conduit 70 around the right angle bend 86. The expanding compressed fluid moves around the right angle bend 86 through the second segment 88 exiting the opening 90 into the T-Head connector 80.

The T-Head connector 80 volume is much greater than the regions that the compressed fluid has passed. The result of the larger volume is that the compressed fluid rapidly decompresses releasing mechanical energy in the form of a sonic event.

The sonic event is transmitted through the fluid in the T-Head connector 80 into the annulus 146. The measurement of the level of liquid in annulus 146 is determined by the Doppler effect as received by the microphone 110. The signal from the microphone is transmitted to the computer 120.

When the computer 120 has correlated the data from the sonic events the computer 120 determines the amount of liquid 180 in the wellhead 138. The computer then generates a signal to the pump (not shown) to order the pump to begin operation to remove liquid 180 from the wellhead 138. Similarly, the computer 120 may generate a signal to the pump to discontinue the pumping operation to prevent an excess of liquid 180 from being removed from the well.

For continuous operation of a well, such as with a screw pump, the operating conditions may be varied to maximize production while minimizing electric consumption. That is, every time a well starts pumping a large voltage is required to overcome the pump inertia. If the pump is operated on a continuous basis electrical consumption may be minimized. Similarly, where it is desired to stop to start pumping, the optimum conditions for removing liquid 180 from the tubing 142 may be determined.

Figure 4:
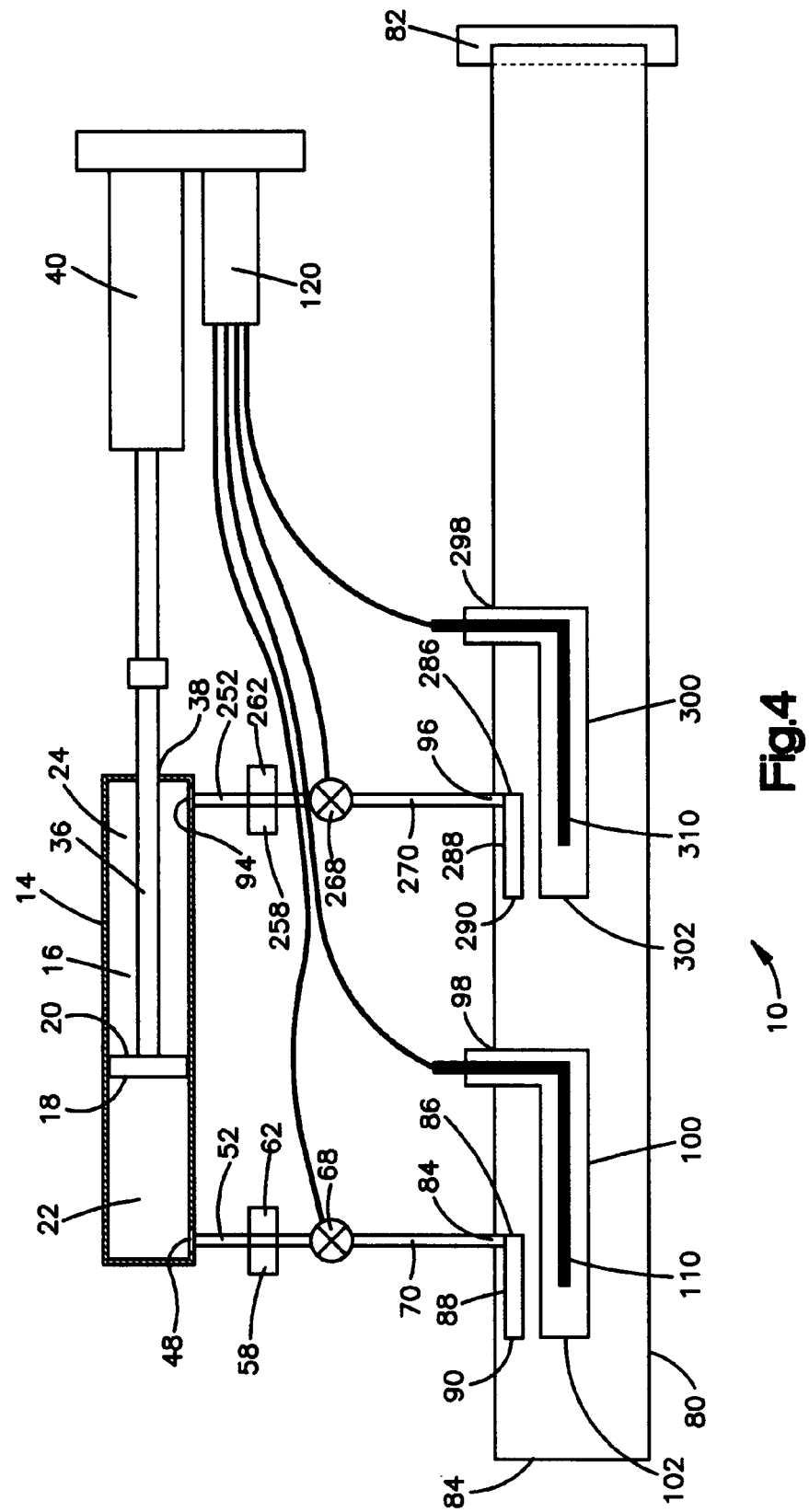
FIG. 4 is a partial sectional view of a second embodiment of the present invention; and, FIG. 5 is sectional view of a propane storage tank.

A second embodiment of the present invention is shown in FIG. 4. The tube 92 is replaced with the following components.

The piston after chamber 24 has an opening 94. A conduit 252 forms an airtight seal at the opening 94 with the piston after chamber 24. The conduit 252 is thus in fluid communication with the piston after chamber 24.

The conduit 252 is connected with a pressure measuring device 258. The pressure measuring device 258 is located so as to determine fluid pressure within the conduit 252. The conduit 252 is also connected with a temperature measuring device 262. The temperature measuring device 262 is located so as to determine fluid temperature within the conduit 252.

A valve 268 provides for fluid flow and fluid shutoff to the conduit 252. A second conduit 270 is connected to the valve 268. The valve 268 controls fluid flow between the conduit 252 and the second conduit 270.

An opening 96 is located in the T-Head connector 80. The second conduit 270 makes an airtight seal with the T-Head connector 80 at the opening 96. The second conduit 270 provides fluid communication between the piston after chamber 24 and the T-Head connector 80.

The second conduit 270 extends through the opening 96 into the T-Head connector 80. The T-Head connector 80 has an opening 84. The second conduit 270 makes an airtight connection with the T-Head connector 80.

The second conduit 270 has a right angle bend 286 within the T-Head connector 80. The right angle bend 286 provides a second segment 288 of the second conduit 270.

The second segment 288 of the second conduit 270 has an opening 290 to provide fluid communication to the T-Head connector 80 of a well 12. The opening 290 is at the opposite end from the closure cap 82. Thus, when the valve 268 is in the open position there is fluid communication from the opening 290 to the piston after chamber 24.

A microphone opening 298 is located in the T-Head connector 80. A microphone conduit 300 is adapted to form an airtight seal in the T-Head connector 80 at the microphone opening 298. The microphone conduit 300 has an open end 302 in fluid communication the T-Head connector 80.

The microphone 310 is preferably a condenser microphone. The microphone 310 is preferably unidirectional. The microphone 310 is essentially the same as the microphone 110 seen in FIG. 3. The microphone 310 is connected to the computer 120. The computer 120 is capable of processing the reception of sonic events by the microphone 310.

The second mode of operation is generally the same as the first mode of operation. In the second mode of operation, the valve 68 is placed in the closed position to prevent fluid communication between the T-Head connector 80 and the piston fore chamber 22. The T-head valve 160 is open such that the T-Head connector 80 is in fluid communication with the T-Head connection 150. The T-Head connection 150 is then in fluid communication with the annulus 146 of a well as shown in FIG. 2.

The pressure of the gas in the annulus 146 is determined by the pressure measuring device 58 with the valve 68 open. The pressure determined by the pressure measuring device 58 is reported to the computer 120.

The temperature measuring device 62 may be used to measure the fluid temperature in the annulus 146 at this time. As the operation of the invention may be conducted in a dynamic manner the temperature of the fluid drawn through the T-Head connector 80 is effectively the temperature of the fluid in annulus 146. The fluid temperature determined by temperature measuring device 62 is reported to the computer 120.

The valve 68 is then placed in the closed position preventing further fluid communication between the annulus 146 and the piston fore chamber 22. The valve 268 is placed in the open position to reduce the effort needed to draw the piston 16 away from the valve 68.

The piston 16 is moved away from the closed valve 68 causing an effective axial expansion of the piston fore chamber 22 with the result being a partial vacuum in the piston fore chamber 22. The valve 68 is rapidly opened resulting in a sonic event (an implosion) as the fluid from the annulus 146 moving into the piston fore chamber 22. The return echo from the sonic event is received by the microphone 110 and the data therefrom transmitted to the computer 120.

The piston 16 is then driven toward the closed valve 68. Simultaneously, the valve 268 is closed. The driving of the piston 16 compresses the fluid in the piston fore chamber 22 thereby forming a compressed fluid having a greater pressure and temperature than the fluid in the annulus 146. Typically, it is desirable that the pressure of the compressed fluid in the piston fore chamber 22 be at least 30 psi greater than the pressure of the fluid in the annulus 146.

The pressure and the temperature of the compressed fluid in the piston fore chamber 22 may be measured by the pressure measuring device 58 temperature measuring device 62 and reported to the computer 120.

The valve 68 is then opened releasing the compressed fluid through the second conduit 70 around the right angle bend 86. The expanding compressed fluid moves around the right angle bend 86 through the second segment 88 exiting the opening 90 into the T-Head connector 80.

The T-Head connector 80 volume is much greater than the regions that the compressed fluid has passed. The result of the larger volume is that the compressed fluid rapidly decompresses releasing mechanical energy in the form of a sonic event.

The sonic event is transmitted through the fluid in the T-Head connector 80 into the annulus 146. The measurement of the level of liquid in annulus 146 is determined by the Doppler effect as received by the microphone 110. The signal from the microphone is transmitted to the computer 120.

When the valve 68 is opened to release the compressed fluid the valve 268 is also opened causing a sonic event by the implosion of fluid into the piston after chamber 24. The implosion caused by the valve 268 opening is received by the microphone 310.

The operation of generating sonic events continues with valve 68 being closed while the piston 16 is withdrawn away from valve 68. Simultaneously, the valve 268 is closed and the piston rear face 20 begins to compress fluid in the piston after chamber 24. The compressed fluid in the piston after chamber 24 is then released when the valve 268 is opened thus generating another sonic event.

Four sonic events are generated by each piston cycle. By varying the degree that each of valve 68 and valve 268 are open as well as by varying the size of the piston fore chamber and the piston after chamber the tone of each sonic event may be varied to differentiate the echo received by the microphone 110 and microphone 310.

When the computer 120 has correlated the data from the various sonic events the computer 120 determines the amount of liquid 180 in the wellhead 138. The computer then generates a signal to the pump (not shown) to order the pump to begin operation to remove liquid 180 from the tubing 142. Similarly, the computer 120 may generate a signal to the pump to discontinue the pumping operation to prevent an excess of liquid 180 from being removed from the well.

The device 10 may also be operated in a wellhead 138 to aid in pumping propane or other liquefied gas. The definition of pumping includes maintaining the static state of not removing any propane or other liquefied gas from underground storage but rather measuring the volume by determining the depth of the well to the point where the liquefied gas begins. In this manner not only can inventory of the propane or other liquefied gas in the well be determined but also the amount of propane or other liquefied gas that may be pumped into the well.

Figure 5:
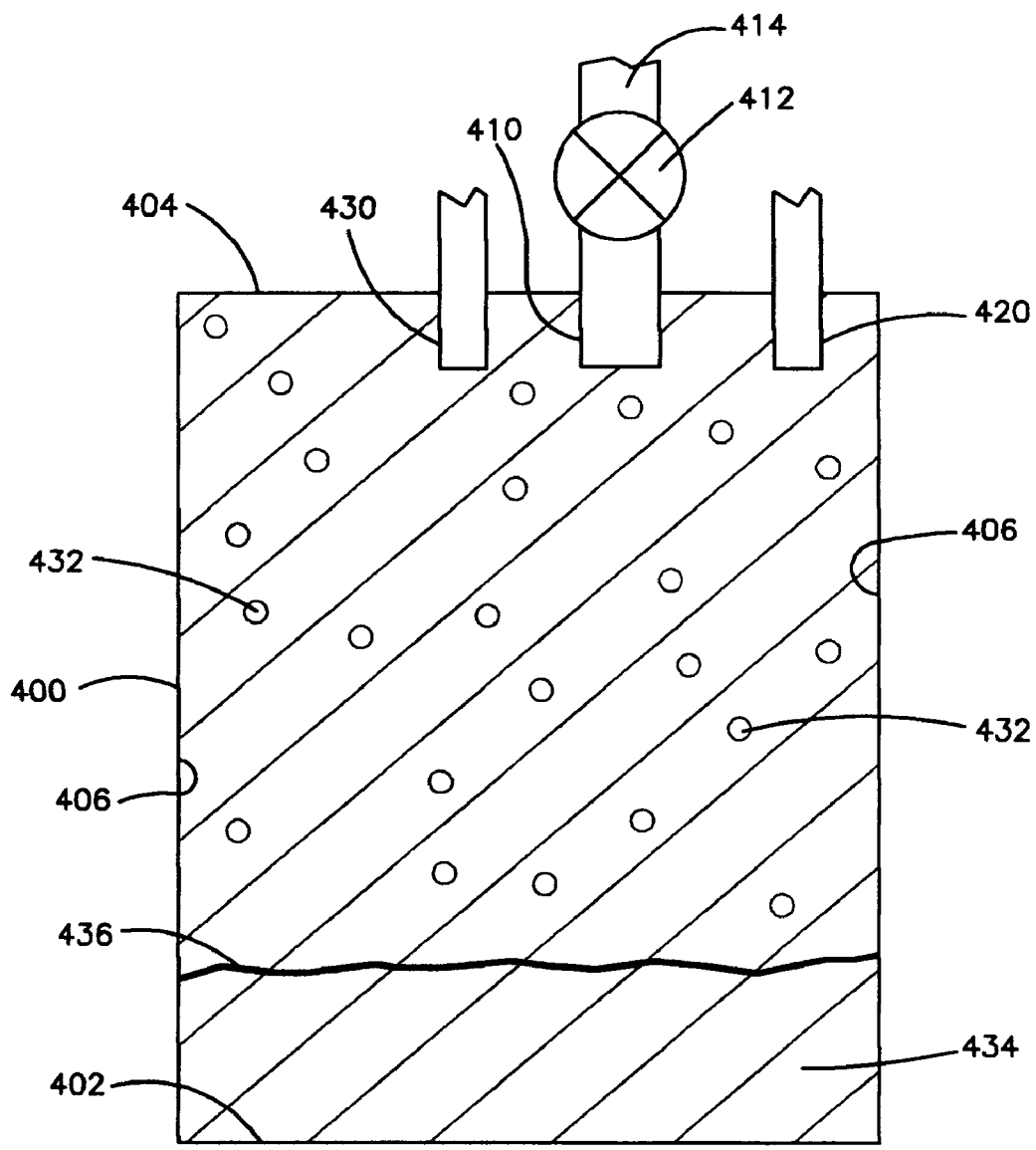

As best seen in FIG. 5 is a liquefiable gas storage tank 400. The liquefiable gas storage tank 400 is an enclosed vessel having a liquefiable gas storage tank bottom 402. The liquefiable gas storage tank 400 has a liquefiable gas storage tank top 404. The liquefiable gas storage tank 400 is generally cylindrical in shape having a liquefiable gas storage tank sidewall 406.

The liquefiable gas storage tank 400 has a gas withdrawal conduit 410 extending through the liquefiable gas storage tank top 404. A gas flow control valve 412 controls fluid communication between the liquefiable gas storage tank 400 and the gas take off conduit 414.

A microphone assembly 420 extends through the liquefiable gas storage tank top 404 of the liquefiable gas storage tank 400. The microphone assembly 420 is sealed to the liquefiable gas storage tank top 404 to prevent leakage of gas from the liquefiable gas storage tank 400.

A piston assembly 430 extends through the liquefiable gas storage tank top 404 of the liquefiable gas storage tank 400. The piston assembly 430 is sealed to the liquefiable gas storage tank top 404 to prevent leakage of gas from the liquefiable gas storage tank 400. The piston assembly 430 is similar in design and function to the components of the pump controlling device 10.

In use, the piston assembly 430 has components corresponding to the piston chamber 14 and the piston 16. A valve (not shown) is alternately opened and closed to provide fluid communication between the piston chamber 14 and gas 432 within the liquefiable gas storage tank 400. The piston is driven forward against the closed valve to compress the gas within the piston chamber 14. When the gas has been sufficiently compressed within the piston chamber 14 the valve is opened. As the compressed gas is under a greater pressure than the gas 432 within the liquefiable gas storage tank 400 the compressed gas decompresses and releases mechanical energy thereby generating a sonic event.

The sonic event (acoustic waves) travel through the gas 432 within the liquefiable gas storage tank 400. The acoustic waves eventually reach the surface of the liquefied gas 434 that is gravitationally positioned at a level below the level of gas 432. The acoustic waves are reflected from the surface of the liquefied gas 434 toward the microphone assembly 420. The microphone assembly 420 receives the reflected acoustic wave. By knowing the shape and volume of the liquefiable gas storage tank 400 the Doppler effect may be utilized to the determine the amount of liquefied gas and gas within the liquefiable gas storage tank 400.

The inventions embodied herein are merely exemplary and the suggested feature should be utilized to unduly limit the scope of the invention.

What is claimed is:

1. A method for controlling pump conditions for a well comprising:

at least partially opening a first valve to permit fluid communication between a gas compression chamber and a wellhead;

closing said first valve to prevent fluid communication between said gas compression chamber and the wellhead;

activating said gas compression chamber to compress fluid in said gas compression chamber thereby obtaining a compressed fluid in said gas compression chamber;

at least partially opening said first valve to release the compressed fluid into the wellhead thereby generating a sonic event;
obtaining data from the sonic event;
processing the data from the sonic event to determine the conditions for controlling the pump.

2. A method for controlling pump conditions for a well comprising:
closing a first valve to prevent fluid communication between a piston chamber and a wellhead;
moving a piston in said piston chamber away from said valve;
opening said valve to permit fluid from the wellhead into the piston chamber thereby generating a sonic event;
obtaining data from the sonic event;
processing the data from the sonic event to determine the conditions for controlling the pump.

3. The method of claim 2 wherein said piston within said piston chamber is moved away from said first valve and the pressure behind said piston is at the ambient pressure of the wellhead.

4. A method for controlling pump conditions for a well comprising:
closing a first valve in a piston chamber to prevent fluid communication between said piston chamber and the wellhead;
simultaneously closing a second valve in said piston chamber to prevent fluid communication between said piston chamber and the wellhead;
moving a piston in said piston chamber away from said first valve so as to create a partial vacuum in the region between said first valve and said piston while compressing fluid in the region between said second valve and said piston;
simultaneously opening said first valve and said second valve to create a first sonic event in the wellhead and a second sonic event in the wellhead;
obtaining data from at least one of the sonic events; and,
processing the data from the sonic event to determine the conditions for controlling the pump.

5. The method according to claim 4 wherein at least one of the first sonic event in the wellhead and the second sonic event in the wellhead occurs in the annulus of said wellhead.

6. A method for controlling pump conditions for a well comprising:
at least partially opening a first valve to permit fluid communication between a piston chamber and a wellhead;
said piston chamber having therein a piston;
said piston having a front face and a rear face;
said piston chamber having a second valve;
closing said first valve to prevent fluid communication between said piston chamber and the wellhead;
driving said piston within said piston chamber in the direction of said first valve such that the first face of said piston compresses fluid in said piston chamber thereby obtaining a compressed fluid in said piston chamber;
at least partially opening said first valve to release the compressed fluid into the wellhead thereby generating a sonic event;
obtaining data from the sonic event;
processing the data from a sonic event to determine the conditions for controlling the pump.

7. The method of claim 6 wherein said second valve is open while said piston is moved away from said first valve.

8. The method of claim 6 wherein said second valve is closed while said piston is moved away from said first valve.

9. The method of claim 6 wherein said second valve is closed while said piston is moved away from said first valve and fluid between said second piston face and said second valve is compressed.

10. The method according to claim 6 wherein at least one of the first sonic event in the wellhead and the second sonic event in the wellhead occurs in the annulus of said wellhead.

11. A device for controlling pump conditions in a well comprising:
a T-Head connector;
a gas compressor, for when in use, to compress gas from within a wellhead;
said gas compressor connected with said T-Head connector;
a first valve for controlling fluid communication between said gas compressor and the wellhead;
a computer controller;
said computer controller connected with said first valve to open and close said first valve to permit fluid communication between said gas compressor and the wellhead;
said computer controller to activate said gas compressor, for when in use, to receive gas from the wellhead, and,
said computer controller connected with said gas compressor, for when in use, to open a valve to release the compressed gas into the wellhead.

12. The device according to claim 11, wherein said computer controller, for when in use, controlling pump conditions in a well to permit withdrawal of a liquid from the well.

13. The device according to claim 11, wherein at least one pressure sensor is connected with said device and said at least one pressure sensor provides pressure readings from within the wellhead.

14. A method for controlling pump conditions in a well having a wellhead pump, well tubing, and a well annulus comprising:
a T-Head connector;
a pump to remove liquid through well tubing;
a gas compressor, for when in use, to compress gas from within a wellhead;
said gas compressor connected with said T-Head connector;
a first valve for controlling fluid communication between said gas compressor and the wellhead;
a computer controller;
said computer controller connected with said first valve to open and close said first valve to permit fluid communication between said gas compressor and the wellhead;
said computer controller to activate said gas compressor, for when in use, to receive gas from the wellhead,
said computer controller connected with said gas compressor, for when in use, to open a valve to release said compressed gas into the wellhead;
said released compressed gas generating pressure events within the wellhead;
obtaining data from said pressure events; and,
processing the data from said pressure events to determine the conditions for controlling the pump to remove liquid through the well tubing.

* * * * *